(12) United States Patent
Gardner et al.

(10) Patent No.: US 11,776,559 B2
(45) Date of Patent: Oct. 3, 2023

(54) DETERMINING SUBTITLE SYNCHRONIZATION WHEN COMPARED TO AUDIO TRACK

(71) Applicant: NBCUNIVERSAL MEDIA, LLC, Universal City, CA (US)

(72) Inventors: Craig Gardner, Littleton, CO (US); Christopher Burdorf, Beverly Hills, CA (US)

(73) Assignee: NBCUNIVERSAL MEDIA, LLC, Universal City, CA (US)

( * ) Notice: Subject to any disclaimer, the term of this patent is extended or adjusted under 35 U.S.C. 154(b) by 166 days.

(21) Appl. No.: 17/450,548

(22) Filed: Oct. 11, 2021

(65) Prior Publication Data
US 2022/0284916 A1 Sep. 8, 2022

Related U.S. Application Data

(60) Provisional application No. 63/157,513, filed on Mar. 5, 2021.

(51) Int. Cl.
| | |
|---|---|
| *G10L 21/055* | (2013.01) |
| *H04N 5/278* | (2006.01) |
| *G10L 15/22* | (2006.01) |
| *G10L 25/57* | (2013.01) |
| *G10L 25/78* | (2013.01) |

(52) U.S. Cl.
CPC ............ *G10L 21/055* (2013.01); *G10L 15/22* (2013.01); *G10L 25/57* (2013.01); *G10L 25/78* (2013.01); *H04N 5/278* (2013.01)

(58) Field of Classification Search
CPC ....... G10L 21/055; G10L 21/00; G10L 21/06; G10L 21/10; G10L 21/12; G10L 21/51; G10L 21/57; G10L 21/78; G10L 21/81; G10L 21/87; G10L 25/03; G10L 25/06; G10L 25/51; G10L 25/57; G10L 25/69; G10L 25/78; G10L 25/81
USPC ................................ 704/206, 215, 216, 218
See application file for complete search history.

(56) References Cited

U.S. PATENT DOCUMENTS

| | | | | |
|---|---|---|---|---|
| 5,862,450 | A * | 1/1999 | Mandal ............ | H04N 21/26208 375/E7.278 |
| 6,411,933 | B1* | 6/2002 | Maes ..................... | G06V 40/70 704/E17.002 |
| 2007/0106508 | A1* | 5/2007 | Kahn ..................... | G10L 15/22 704/E15.04 |

(Continued)

*Primary Examiner* — Qi Han
(74) *Attorney, Agent, or Firm* — LEE, HONG, DEGERMAN, KANG & WAIMEY PC

(57) ABSTRACT

According to at least one embodiment, a method for determining a level of synchronicity between subtitle text in audiovisual content and speech that would be heard during display of the audiovisual content includes: accessing a first binary sequence, each bit of the first binary sequence indicating whether the speech is provided at a respective sampling time of a plurality of sampling times; and accessing a second binary sequence, each bit of the second binary sequence indicating whether the subtitle text is provided at a respective sampling time of a plurality of sampling times. The method further includes comparing the first binary sequence and the second binary sequence to determine the level of synchronicity between the subtitle text and the speech.

20 Claims, 8 Drawing Sheets

(56) References Cited

U.S. PATENT DOCUMENTS

2014/0172141 A1* 6/2014 Mangold ............... G10L 19/018
  700/94

* cited by examiner

| | | Result | n[0] | n[1] | n[2] | n[3] | n[4] | n[5] | n[6] | n[7] |
|---|---|---|---|---|---|---|---|---|---|---|
| Audio Samples | x | | 1 | 1 | 1 | 0 | 1 | 1 | 1 | 1 |
| Subtitle Samples | y | | 1 | 1 | 0 | 0 | 1 | 1 | 1 | 1 |
| Sum of Sample * Sample (Cross Correlation Result) | x(n)y(n) | 6 | 1 | 1 | 0 | 0 | 1 | 1 | 1 | 1 |
| Sum of Squares of Audio Samples | x[n]2 | 7 | 1 | 1 | 1 | 0 | 1 | 1 | 1 | 1 |
| Sum of Squares of Subtitle Samples | y[n]2 | 6 | 1 | 1 | 0 | 0 | 1 | 1 | 1 | 1 |
| Square Root of Sums of Squares Multiple | sqrt(SUM(x[n]2)SUM(y[n]2)) | 6.48 | | | | | | | | |
| Correlation / Signal Energy == Normalized Cross Correlation | Norm_Corr | 0.93 | | | | | | | | |

FIG. 2B

| | | Result | n[0] | n[1] | n[2] | n[3] | n[4] | n[5] | n[6] | n[7] |
|---|---|---|---|---|---|---|---|---|---|---|
| Audio Samples | x | 248 | 0 | 0 | 0 | 0 | 0 | 1 | 0 | 1 |
| Subtitle Samples | y | 238 | 1 | 1 | 0 | 0 | 1 | 1 | 1 | 1 |
| Sum of Sample * Sample (Cross Correlation Result) | x(n)y(n) | 1 | 0 | 0 | 0 | 0 | 0 | 1 | 0 | 1 |
| Sum of Squares of Audio Samples | x[n]2 | 1 | 0 | 0 | 0 | 0 | 0 | 1 | 0 | 1 |
| Sum of Squares of Subtitle Samples | y[n]2 | 6 | 1 | 1 | 0 | 0 | 1 | 1 | 1 | 1 |
| Square Root of Sums of Squares Multiple | sqrt(SUM(x[n]2)SUM(y[n]2)) | 2.45 | | | | | | | | |
| Correlation / Signal Energy == Normalized Cross Correlation | Norm_Corr | 0.41 | | | | | | | | |

FIG. 2C

Normalized Correlation 0.937752

DETERMINING SUBTITLE SYNCHRONIZATION WHEN COMPARED TO AUDIO TRACK

CROSS-REFERENCE TO RELATED APPLICATION(S)

Pursuant to 35 U.S.C. § 119(e), this application claims the benefit of U.S. Provisional Patent Application No. 63/157,513, filed on Mar. 5, 2021, the contents of which are hereby incorporated by reference herein in their entirety.

BACKGROUND

Subtitles include text that is displayed along with video during playback of audiovisual content. The audiovisual content may include pre-recorded content such as films, television programs, etc. The text of the subtitles may be derived from either a transcript or a screenplay of dialogue in the audiovisual content. The text may also be derived from related commentary. Subtitles of such types may include multi-language subtitles for video assets that are to be distributed internationally.

During content quality control processes, an operator may review playback of audiovisual content, in which video is displayed concurrently with the corresponding subtitles. Here, the operator may check whether subtitles are properly synchronized with respect to audio dialogue that is heard during the playback of the audiovisual content. Synchronization of such subtitles may be reviewed at random "point in time" checks. In this regard, at a randomly chosen time during the course of the playback, the operator checks whether the subtitle text (if any) that is displayed at that time is displayed in synchronization with audio dialogue (if any) that is heard at or around that time. One or more similar checks may be performed at one or more other chosen times.

The check may involve a relatively rudimentary visual check: e.g., whether subtitle text is displayed (or not displayed) at or around the time that audio dialogue is heard (or not heard).

As another example, the check may be further based on consideration or interpretation of subtitle text that is displayed. For example, if the subtitle is in the English language and the audio dialogue is in the French language, an operator, who is able to read English but not able to understand French, may check for synchronization by determining whether the text of the English-language subtitle is a sufficiently proper (e.g., accurate) translation of the French-language dialogue. Here, hardware and/or software for performing speech-to-text recognition and subsequent translation of the recognized text may be used.

SUMMARY

As noted earlier, the described checks may be performed at random times during the course of playing back the audiovisual content. However, performing such checks is often time consuming. Also, these checks may serve to produce an incomplete measure of synchronization. This is because synchronization is checked at only selected times. As such, the degree of synchronization is not checked at times during the playback that were not selected.

Aspects of this disclosure are directed to providing a more complete measure of synchronization of subtitles relative to audio dialogue. For example, such a measure may indicate an overall degree of synchronicity over a full duration (or length) of the underlying audiovisual content. The measure of synchronization may represent a more comprehensive measure of a degree to which the subtitles are in (or, conversely, out of) synchronization with audio dialogue in the audiovisual content.

According to at least one aspect, at each of multiple times (or intervals) spanning the duration of the underlying audiovisual content, the presence (or absence) of subtitle content that would be displayed during that time (or interval) is checked against the presence (or absence) of spoken audio that would be heard during that time (or interval). According to one or more particular aspects, statistical and/or mathematical considerations (e.g., considerations involving phase difference and/or cross-correlation) may be taken into account.

According to at least one embodiment, a method for determining a level of synchronicity between subtitle text in audiovisual content and speech that would be heard during display of the audiovisual content includes: accessing a first binary sequence, each bit of the first binary sequence indicating whether the speech is provided at a respective sampling time of a plurality of sampling times; and accessing a second binary sequence, each bit of the second binary sequence indicating whether the subtitle text is provided at a respective sampling time of a plurality of sampling times. The method further includes comparing the first binary sequence and the second binary sequence to determine the level of synchronicity between the subtitle text and the speech.

According to at least one embodiment, an apparatus for determining a level of synchronicity between subtitle text in audiovisual content and speech that would be heard during display of the audiovisual content is disclosed. The apparatus includes: a network communication unit configured to transmit and receive data; and one or more controllers. The one or more controllers are configured to: access a first binary sequence, each bit of the first binary sequence indicating whether the speech is provided at a respective sampling time of a plurality of sampling times; access a second binary sequence, each bit of the second binary sequence indicating whether the subtitle text is provided at a respective sampling time of a plurality of sampling times; and compare the first binary sequence and the second binary sequence to determine the level of synchronicity between the subtitle text and the speech.

According to at least one embodiment, a machine-readable non-transitory medium has stored thereon machine-executable instructions for determining a level of synchronicity between subtitle text in audiovisual content and speech that would be heard during display of the audiovisual content. The instructions include: accessing a first binary sequence, each bit of the first binary sequence indicating whether the speech is provided at a respective sampling time of a plurality of sampling times; accessing a second binary sequence, each bit of the second binary sequence indicating whether the subtitle text is provided at a respective sampling time of a plurality of sampling times; and comparing the first binary sequence and the second binary sequence to determine the level of synchronicity between the subtitle text and the speech.

BRIEF DESCRIPTION OF THE DRAWINGS

The above and other aspects and features of the present disclosure will become more apparent upon consideration of the following description of embodiments, taken in conjunction with the accompanying drawing figures.

FIG. 2B illustrates determination of a cross-correlation value in a sample interval according to at least one embodiment.

FIG. 2C illustrates a determination of a cross-correlation value between two other sequences according to at least one embodiment.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, as well as procedural, changes may be made without departing from the scope of the present invention. Wherever possible, the same reference numbers will be used throughout the drawings to refer to the same or similar parts.

Figure 1A:
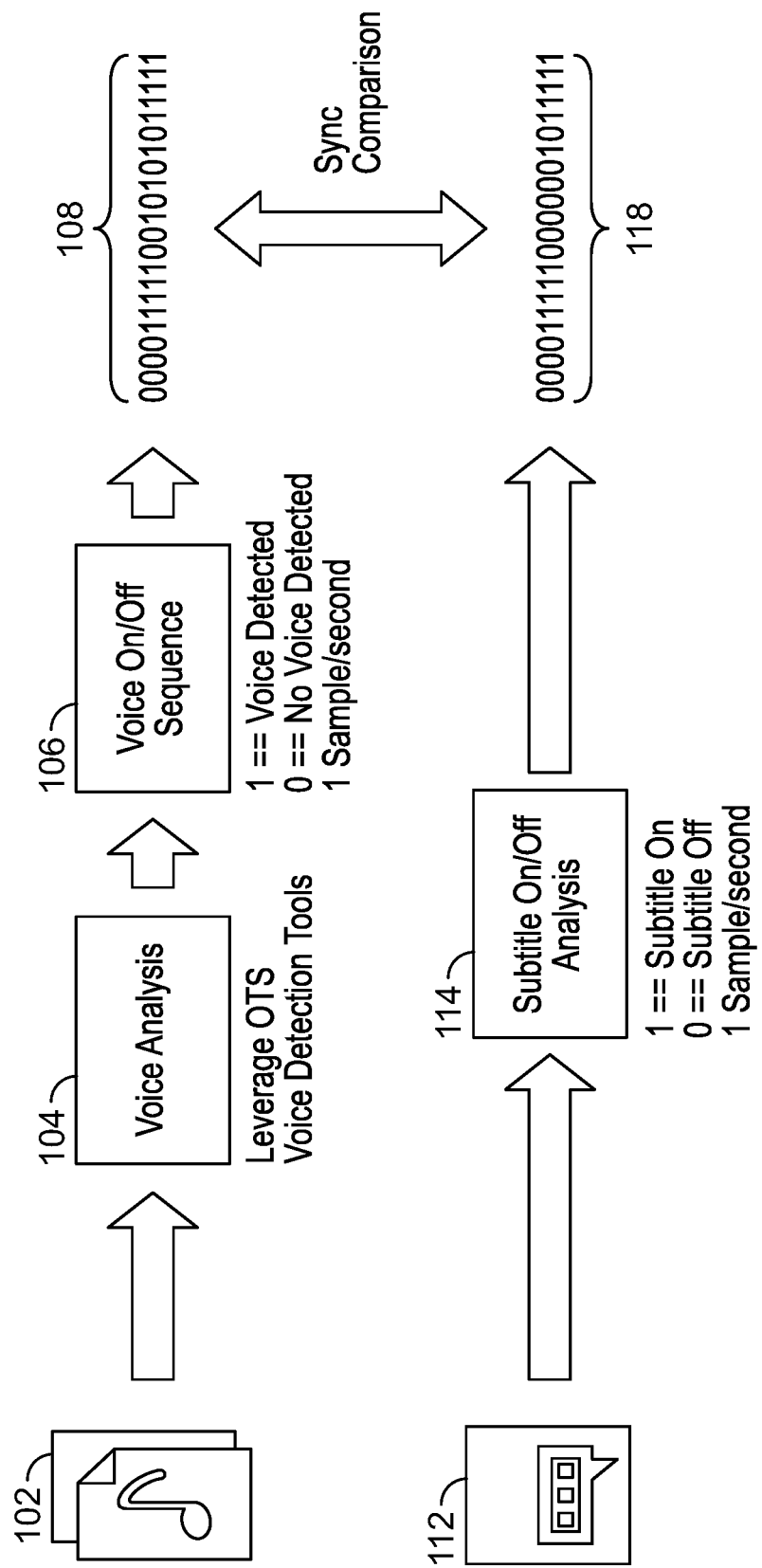
FIG. 1A illustrates an example of a process for providing a measure of subtitle synchronization relative to audio (e.g., audio dialogue or spoken audio) according to at least one embodiment.

FIG. 1A illustrates an example of a process for providing a measure of subtitle synchronization relative to audio (e.g., audio dialogue spoken by a human) according to at least one embodiment. As will be described in more detail below, two sequences (e.g., two binary sequences) are produced, and a comparison between the two sequences is performed.

With reference to FIG. 1A, an audio track 102 is received. The audio track 102 may be extracted from audiovisual content (e.g., pre-recorded content such as a film, a television program, etc.). The audio track 102 may be in any of various formats (e.g., .wav format).

A voice analysis 104 of the audio track 102 is then performed. Performing the voice analysis 104 may include using one or more voice detection tools. Such a tool would be configured to detect the presence (or, conversely, absence) of a human voice that would be heard at a given time during playback of the audio track 102. The human voice may be detected, for example, even amidst the presence of one or more other types of sounds (e.g., background noise, soundtrack music) that would be heard during playback of the audio track 102. To do so, the tool would be capable of distinguishing a human voice from such other types of sounds. Such tools may be capable of making such distinctions with at least a particular threshold degree of accuracy (e.g., 85%). In this regard, a tool that removes background music from the audio track 102 prior to the performance of the voice analysis 104 may be used.

Based on the voice analysis 104, a sequence generator 106 generates a sequence 108. The sequence 108 may be a binary sequence, where individual bits in the sequence indicate whether presence of a human voice was detected at respective points in time. As such, the sequence 108 provides a temporal representation of whether a human voice is detected in the audio track 102. In another aspect, instead of the sequence generator 106, another information generator may be used that indicates the time intervals during which human audio is present or absent.

Referring to FIG. 1A, the time reference points may be identified (or derived) based on a provided frame rate corresponding to the audio track 102 (e.g., a frame rate that is included in metadata of the audio track 102). In this regard, the time reference points are identified because the audio track 102 does not necessarily carry time markers (e.g., embedded time markers). When such time markers are not present in the audio track 102, time reference points that are identified are utilized to align the detection of a human voice, in the time domain, with specific points in time. For example, based on a specific anchor reference point (e.g., anchor timecode) and a provided frame rate of 25 frames per second (fps), specific time reference points (e.g., 0 minutes: 40 seconds, 0 minutes:50 seconds, etc. in a 60-second long audio track) may be identified.

For example, if a timecode track is not present on the audio, an anchor timecode is put into the analysis process that can then be used to contextualize the samples within the time domain. This allows the following analysis process to work in situations where start times of the audio and subtitle may not be the same (due to content header/slates present in the audio stream).

Figure 1B:
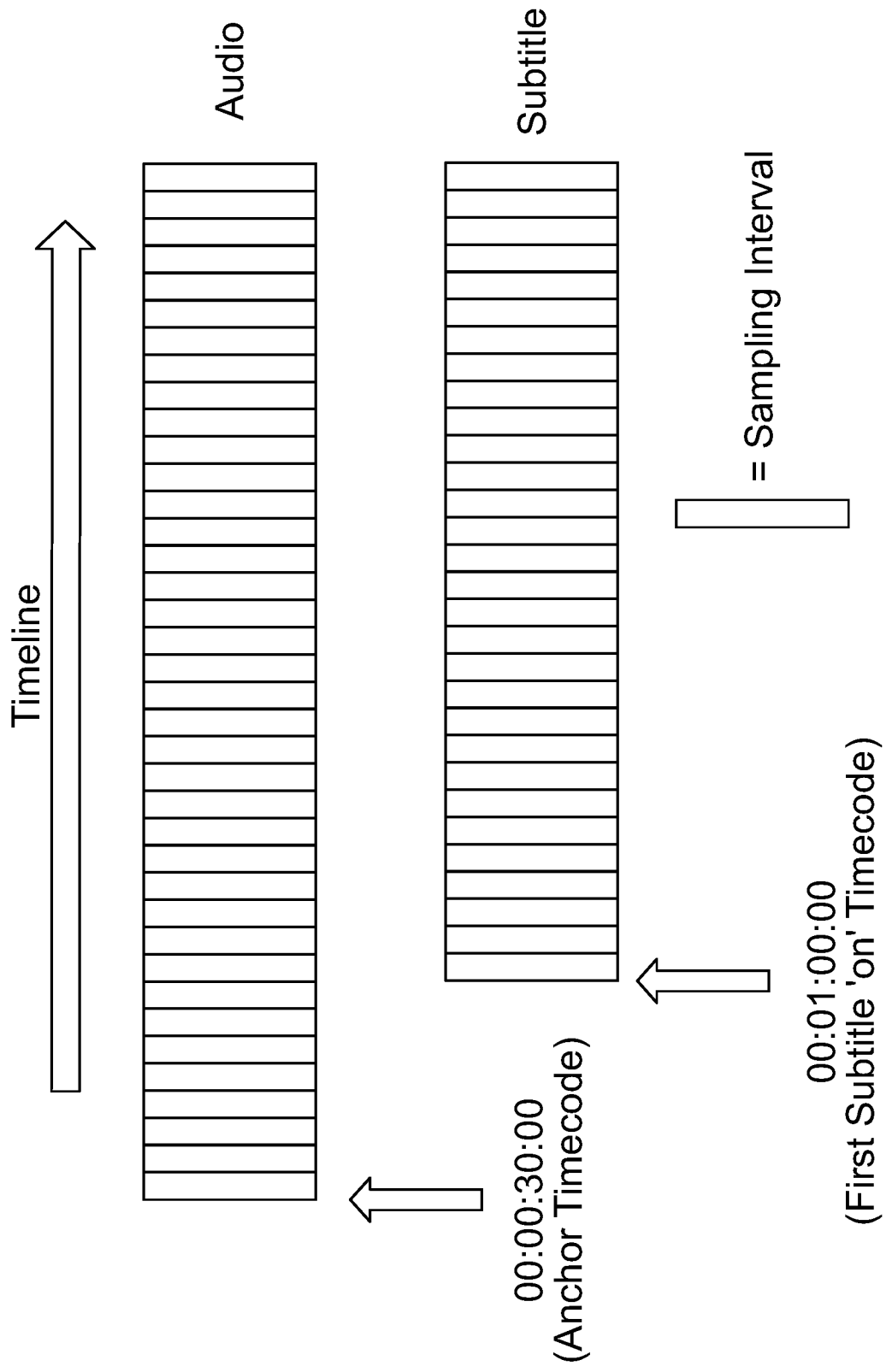
FIG. 1B illustrates an example situation in which start times of an audio track and a subtitle file are not the same.

FIG. 1B illustrates an example situation in which start times of an audio track and a subtitle file are not the same. As illustrated in FIG. 1A, an anchor timecode of 00:00:30:00 (e.g., 0 hours, 0 minutes, 30 seconds) is used as a starting point of reference. However, the subtitle file contains no subtitle text that is to be displayed at the anchor timecode. Rather, FIG. 1B illustrates that the first subtitle text that is to be displayed corresponds to a timecode of 00:01:00:00 (e.g., 0 hours, 1 minute, 00 seconds). As such, subtitles first appear 30 seconds after the anchor timecode.

Video files may include header offsets. For example, a start of a video file may include a color and/or a sound test header that precedes the start of actual video content. Such header offsets may vary from video file to video file. Alternatively (or in addition), such header offsets may be used to improve matching of timecodes in a subtitle file with detected voice activity data.

With reference back to FIG. 1A, each bit in the sequence 108 may carry a binary value. By way of example, a bit may carry a value of "1" to indicate the detection (e.g., presence) of a human voice at a corresponding time reference point, and may carry a value of "0" to indicate the non-detection (e.g., absence) of a human voice at that time reference point. The individual bits may be produced by the sequence generator 106 periodically over the length of the audio track 102. For example, if the audio track 102 is sixty seconds in length and the individual bits are produced at a sampling rate of one bit per second, then the sequence 108 would be sixty bits in length.

With continued reference to FIG. 1A, a subtitle file 112 is received. The subtitle file 112 corresponds to the audiovisual content from which the audio track 102 was extracted. The subtitle file 112 includes the actual subtitles as well as position markers (or time codes) indicating the times at which each subtitle should appear and disappear during playback of the audiovisual content. For example, the subtitle file 112 may include time codes that show the beginning and ending of each utterance. Such time codes may be utilized in various embodiments disclosed herein.

The subtitle file 112 may be a file that is in a binary format (e.g., a file that, in raw form, is composed of 1's and 0's). To improve readability, such a subtitle file 112 is converted to be in another format such as an ASCII format (e.g., a human-readable file format containing subtitle text, such as an .srt format). After being converted, the subtitle file 112 that is in an ASCII format may then be analyzed, as described in more detail below.

An analysis of the subtitle file 112 in the ASCII format is then performed by analyzer 114. The analysis may include determining whether subtitle text would appear (or, conversely, would not appear) at particular points in time (e.g., the time reference points described earlier with reference to the audio track 102). Based on the position markers and the subtitles that are included in the subtitle file 112, the analyzer 114 generates a sequence 118. Individual bits in the sequence 118 indicate whether subtitle text would be displayed at respective points in time during playback of the audiovisual content. As such, the sequence 118 provides a temporal representation of whether subtitle text would be displayed over the course of the playback.

Each bit in the sequence 118 may carry a binary value. By way of example, the bit may carry a value of "1" to indicate the presence of subtitle text that would be displayed at a corresponding time reference point, and may carry a value of "0" to indicate the absence of subtitle text that would be displayed at that time reference point. The time reference point may be one of the identified (or derived) time reference points discussed earlier with reference to the sequence 108. The individual bits may be produced by the analyzer 114 periodically over the length of the audiovisual content. For example, if the audiovisual content is sixty seconds in length and the time reference points are spaced apart by one second, the individual bits are produced at a sampling rate of one bit per second, and the sequence 118 would be sixty bits in length.

According to at least one embodiment, a comparison between the sequences 108 and 118 is performed to determine a measure of synchronization of subtitles in the subtitle file 112 with respect to audio (e.g., audio dialogue) in the audio track 102.

According to at least one particular embodiment, performing the comparison includes analyzing a phase difference between the sequences 108 and 118.

For example, each sequence 108, 118 may be sliced (or divided) over time into sample intervals of a particular length. For example, each sample interval may be 10 samples in length. In this situation, if 1 sample is produced per second, then the length of each sample interval is effectively 10 seconds. As another example, each sample interval may be 5 samples in length. In this situation, if 1 sample is produced per second, then the length of each sample interval is effectively 5 seconds. The sample interval may be any value in length so long as the length is less than or equal to the length of the entire sequence.

After the sequences 108, 118 are sliced in this manner, the behavior of the sequences in each of the sample intervals may be analyzed and compared. For example, for a particular sample interval (e.g., a sample interval beginning at 0 minutes:30 seconds and ending at 0 minutes:40 seconds), the phase difference between the sequences 108, 118 is calculated. Once such a phase difference has been determined for each of the sample intervals, a single value may be determined as a measure of synchronization. For example, an average value of all of the calculated phase difference values may be calculated to produce an average 'sync' value. This value, which may be denoted as a percentage, may serve as a measure of synchronization.

According to at least one particular embodiment, a waveform based on moving averages may be generated from the sequence 108, and a similar waveform may be generated from the sequence 118. Here, moving averages may be utilized to smooth out the sequences 108, 118 at least to some degree. For example, each of such waveforms may capture any of a range of values ranging from 0 to 1, rather than merely discrete binary values of either 0 or 1. The phase difference between respective waveforms corresponding to the sequences 108 and 118 may be calculated. Moving averages will be described in more detail later with reference to FIGS. 3A and 3B.

According to at least one particular embodiment, performing the comparison between the sequences 108 and 118 may include analyzing a cross-correlation between the sequences. A single cross-correlation value may be determined between the entire sequence 108 and the entire sequence 118. Alternatively, multiple cross-correlation values may be determined, where each cross-correlation value corresponds to a respective sample interval. An average cross-correlation value may then be calculated based on the multiple cross-correlation values.

The determination of one of such multiple cross-correlation values will be described in more detail later with reference to FIGS. 2A and 2B. As described earlier with reference to phase differences, each sequence 108, 118 may be sliced (or divided) over time into sample intervals of a particular length. After the sequences 108, 118 are sliced in this manner, the behavior of the sequences in each of the sample intervals may be analyzed and compared. For example, for each sample interval, a cross-correlation value may be calculated using Equation (1) below:

$$\text{norm\_corr}(x, y) = \frac{\sum_{n=0}^{n-1} x[n] * y[n]}{\sqrt{\sum_{n=0}^{n-1} x[n]^2 * \sum_{n=0}^{n-1} y[n]^2}} \quad (1)$$

$$\text{norm\_corr}(x, y) = \frac{\sum_{n=0}^{n-1} x[n] * y[n]}{\sqrt{\sum_{n=0}^{n-1} x[n]^2 * \sum_{n=0}^{n-1} y[n]^2}}$$

In the above equation, x denotes the sequence 118 corresponding to the subtitle file 112, and y denotes the sequence 108 corresponding to the audio track 102. x[i] denotes the $i^{th}$ value (or bit) in a particular sample interval of the sequence 118, where i=0, 1, 2, . . . , (n−1), and n denotes the number of samples in the sample interval. Similarly, y[i] denotes the $i^{th}$ value (or bit) in the same sample interval of the sequence 108, where i=0, 1, 2, . . . , (n−1), and n denotes the number of samples in the sample interval.

The result of the calculation in Equation (1) may be used to produce a normalized cross-correlation value. A larger normalized cross-correlation value indicates that the sequences 108, 118 are more alike (e.g., the subtitles are more in synchronization with the audio dialogue), and a lower normalized cross-correlation value indicates that the sequences 108, 118 are less alike (e.g., the subtitles are less in synchronization with the audio dialogue). According to at least one embodiment, further investigation may be performed (e.g., by a quality control operator) if the normalized cross-correlation value falls below a particular threshold.

Examples of calculating cross-correlation will be described with reference to FIGS. 2A and 2B. FIG. 2A illustrates a sequence 218 corresponding to a subtitle file (e.g., subtitle file 112) and a sequence 208 corresponding to an audio track (e.g., audio track 102). As illustrated in FIG. 2A, the sequences 208 and 218 have matching values at certain samples. At such a sample, the bit value of the sequence 208 is equal to (or the same as) the bit value of the sequence 218. Also, the sequences 208 and 218 have non-matching values at other certain samples. At such a sample, the bit value of the sequence 208 is not equal to (or not the same as) the bit value of the sequence 218.

For example, in the sample interval 222, the sequences 208 and 218 have matching values at all samples within the sample interval. As such, it may be concluded that subtitles in the sample interval 222 are fully synchronized with respect to audio dialogue in this sample interval.

As additional examples, in the sample interval 224 and in the sample interval 226, the sequences 208 and 218 do not have matching values at any samples within each of these sample intervals. As such, it may be concluded that subtitles in the sample interval 224 are not at all synchronized with respect to audio dialogue in this sample interval. Similarly, it may be concluded that subtitles in the sample interval 226 are not at all synchronized with respect to audio dialogue in this sample interval.

As described earlier, multiple cross-correlation values may be determined, each corresponding to a respective sample interval. Examples of such determinations will be described with reference to FIGS. 2A, 2B and 2C.

Figure 2A:
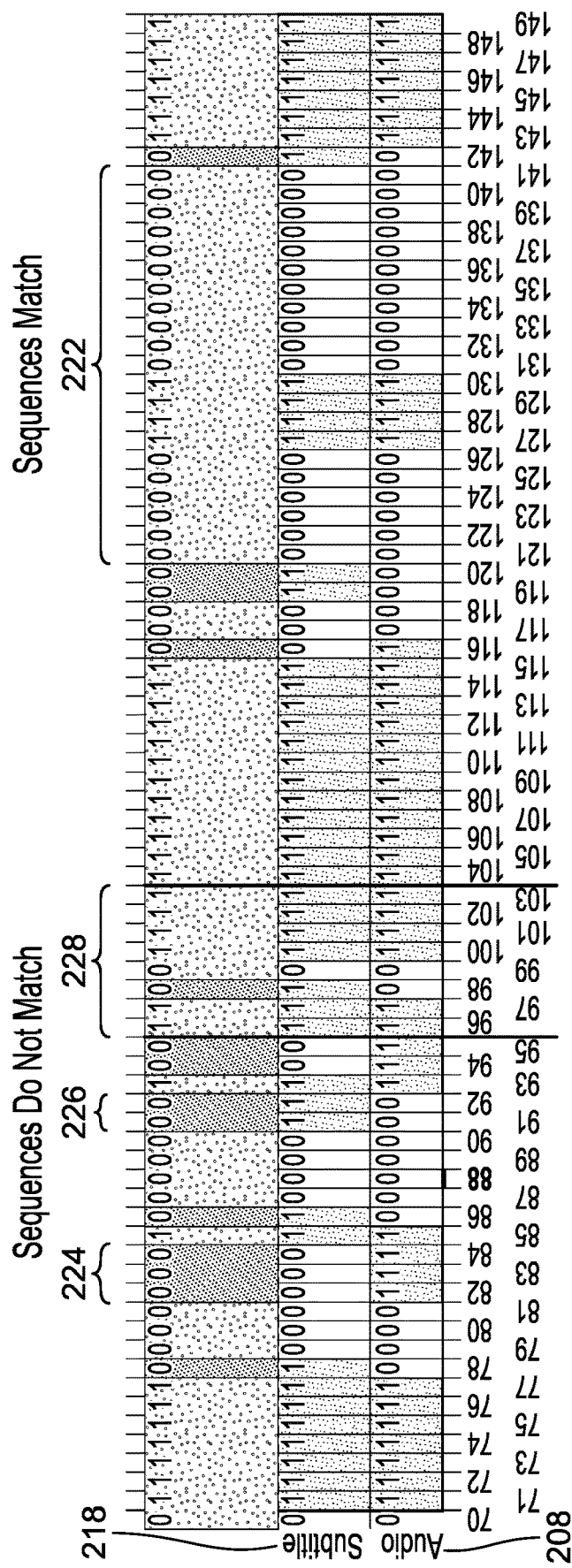
FIG. 2A illustrates a sequence corresponding to a subtitle file and a sequence corresponding to an audio track.

FIG. 2A illustrates a sample interval 228, and FIG. 2B illustrates a determination of a cross-correlation value in the sample interval 228 according to at least one embodiment. The sample interval 228 is illustrated as being eight samples in length. However, it is understood that the lengths of sample intervals may be shorter or longer.

Grouping samples into sample intervals (that are at least two samples in length) may provide a localized view for determining measures of synchronicity. Such localized views may facilitate determinations that a degree of synchronization is increased (or, conversely, reduced) at certain time intervals—e.g., at a beginning portion of the audiovisual content, or at an ending portion of the audiovisual content. As such, larger trends in the degree of synchronization may be more readily identifiable.

With reference to FIG. 2B, in the sample interval 228 of FIG. 2A, the sequence 218 has eight values: x[0], x[1], x[2], x[3], x[4], x[5], x[6], and x[7]. Similarly, in the same sample interval 228, the sequence 208 has eight values: y[0], y[1], y[2], y[3], y[4], y[5], y[6], and y[7].

A cross-correlation of the two sequences in the sample interval 228 may be calculated using Equation (1) provided earlier. As illustrated in FIG. 2B, further calculations may be performed. For example, the values noted in the above paragraph may be used to calculate a normalized cross-correlation (Norm_Corr) value that is between 0 and 1.

FIG. 2B illustrates that the normalized cross-correlation value for the sample interval 228 is relatively high. The value is equal to 0.93, which is much closer to 1 than it is to 0. Such a large value indicates that the subtitle is highly synchronized with the audio dialogue in the sample interval 228. This is consistent with the following observation: as shown in FIG. 2B, the sequences 208 and 218 have values that are aligned in 7 out of 8 samples in the sample interval 228. The sequences 208 and 218 are not aligned in only 1 out of the 8 samples—i.e., the third sample, where x[2] has a value of 1 and y[2] has a value of 0. As a result, the normalized cross-correlation value of 0.93 is higher than a threshold value (e.g., a threshold value of 0.50). It is understood that such a threshold value may be set higher or lower, according to a level of synchronization that is desired.

By way of example, FIG. 2C illustrates a determination of a cross-correlation value between two other sequences in a sample interval according to at least one embodiment. As will be described below, these two sequences exhibit different correlative behavior relative to that of the sequences 208 and 218 in the sample interval 228 of FIG. 2B.

As illustrated in FIG. 2C, sequences 238 and 248 are aligned in a relatively fewer number of samples. In particular, the sequences 238 and 248 have values are aligned in only 3 out of 8 samples in the sample interval: the third sample, the fourth sample and the eighth (last) sample. The sequences 238 and 248 are not aligned in all remaining samples in the sample interval.

As such, the normalized cross-correlation value in the example of FIG. 2C is lower relative to the normalized cross-correlation value in the example of FIG. 2B. As illustrated in FIG. 2C, the normalized cross-correlation value is equal to 0.41, which is closer to 0 than it is to 1. Such a lower value indicates that the subtitle is less synchronized with the audio dialogue in the sample interval. As a result, the normalized cross-correlation value of 0.41 is lower than a threshold value (e.g., a threshold value of 0.50). As noted earlier, such a threshold value may be set higher or lower, according to a level of synchronization that is desired.

According to at least one embodiment, it is understood that the determination of synchronization may be affected by "forced narrative" subtitles in a subtitle file (e.g., subtitle file 112) or non-speech human sounds (e.g., grunts, screams or other vocal sounds) in an audio track (e.g., audio track 102)). "Forced narrative" subtitles correspond to subtitle text that is not spoken. A locational identifier (e.g., "Los Angeles, Calif.") corresponding to a particular shot is an example of subtitle text that does not correspond to speech that is spoken by a particular character or person. Non-speech human sounds (e.g., vocal sounds made by a particular character or person while being physically attacked) may be detected during voice analysis (e.g., voice analysis 104 of audio track 102). A subtitle file may or may not include subtitles that map to such sounds.

According to at least one embodiment, potential discrepancies such as those described above may be considered when analyzing cross-correlation values as described herein. For example, indications of discrepancies between the providing of voice activity and the providing of subtitle text may be listed (e.g., in a table). Here, an indication may indicate a starting time code at which a particular discrepancy first appears or occurs, as well as a duration (e.g., in seconds) over which the discrepancy lasts. A list of such discrepancies may be used to perform debugging and/or to confirm that various features described herein are functioning properly.

As has been described with reference to FIGS. 2A, 2B and 2C, sample intervals may be used to provide localized views. The sample intervals may be formed by slicing the corresponding sequences into intervals having a length of at least 1 sample. The resulting sample intervals may be non-overlapping with respect to time (or samples). For example, if the sample intervals are eight samples in length, then a "window" for selecting the sample intervals may be moved (e.g., shifted over) by exactly eight samples (the exact length of the sample interval) at each selection.

Alternatively, the resulting sample intervals may be overlapping with respect to time (time). For example, the "window" for selecting the sample intervals may be moved by fewer than 8 samples at each selection.

Overlapping sample intervals may be used to perform an analysis based on moving averages. For example, for each sequence, a waveform oscillating between 0 and 1 may be produced by generating moving averages (corresponding to overlapping sample intervals) using a configurable amount of values (or samples). For example, each waveform may carry any of a range of values ranging from 0 to 1, rather than merely discrete values of either 0 or 1. The phase difference (or cross-correlation) between such waveforms may be used to determine a degree of synchronicity between corresponding sequences.

In addition to the cross-correlation techniques as described, other techniques may also be employed to measure the degree to which the subtitle is synchronized with the audio dialogue. For example, XNOR and XOR operator logic may also be used. For example, referring to FIG. 2B, one could take the sum of XNOR(x[0],y[0]), . . . XNOR(x[i],y[i]) and divide the sum by the total number of samples to generate a first normalized correlation value. Like with the cross-correlation with Equation 1, a higher value (closer to 1) generated under this XNOR approach would correspond to a higher degree of synchronization, whereas a lower value (closer to 0) generated under this XNOR approach would correspond to a lower degree of synchronization. XOR may also be used by the values would be reversed such that a higher value generated under the XOR approach would correspond to a lower degree of synchronization, whereas a lower value generated under the XOR approach would correspond to a higher degree of synchronization.

Figure 3A:
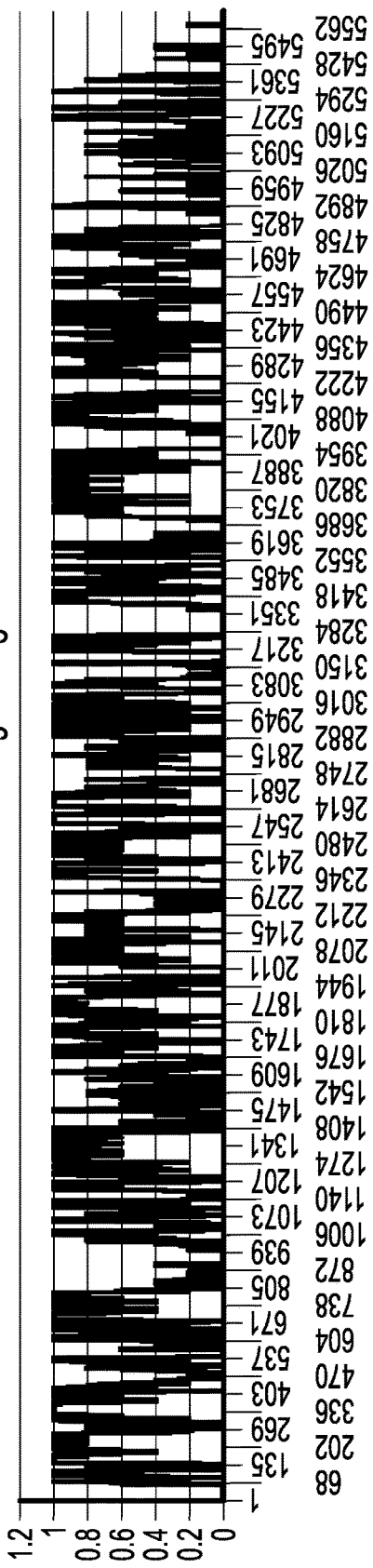
FIG. 3A illustrates an example of a waveform based on moving averages of a sequence corresponding to an audio track of audiovisual content.

FIG. 3A illustrates an example of a waveform based on moving averages of a sequence corresponding to an audio track of audiovisual content. In the waveform of FIG. 3A, the x-axis (horizontal axis) denotes individual samples that are counted beginning at sample #0 and continuing to the end of the sample sequence.

Figure 3B:
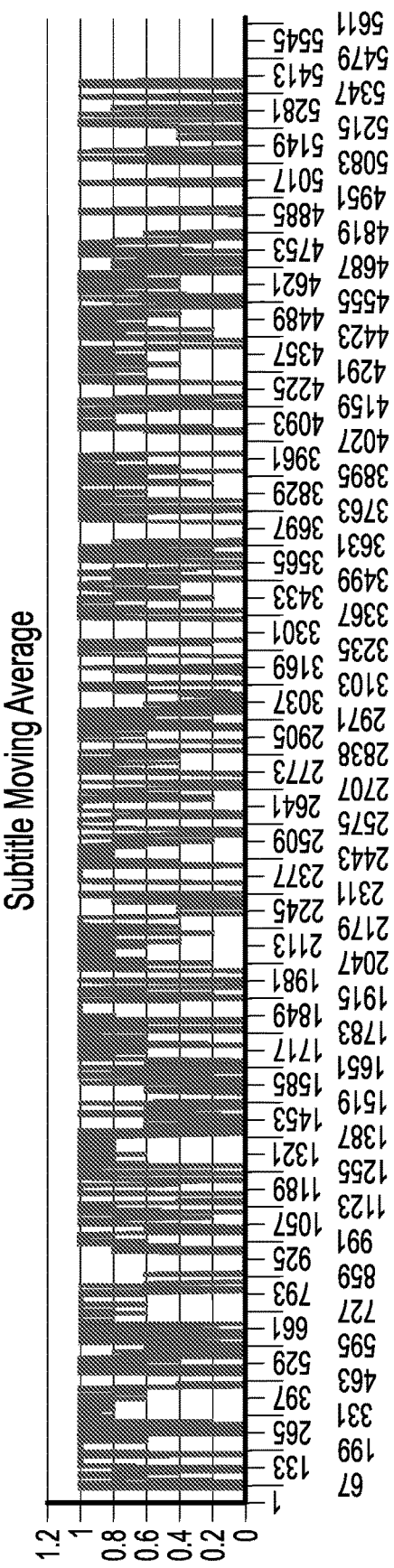
FIG. 3B illustrates an example of a waveform based on moving averages of a sequence corresponding to a subtitle file for the audiovisual content.

FIG. 3B illustrates an example of a waveform based on moving averages of a sequence corresponding to a subtitle file for the audiovisual content. Similar to FIG. 3A, in the waveform of FIG. 3B, the x-axis (horizontal axis) denotes individual samples that are counted beginning at sample #0 and continuing to the end of the sample sequence.

A value of normalized cross-correlation between the waveform of FIG. 3A and the waveform of FIG. 3B may be determined in a manner similar to that described earlier with reference to FIGS. 2B and 2C (e.g., a manner that utilizes Equation (1)).

Based on features that have been described in this disclosure, a measure of synchronization may be determined to indicate a degree of synchronicity between subtitles in audiovisual content and audio dialogue that would be heard in the audiovisual content. This may better represent an overall assessment of a degree to which the display of subtitles is synchronous with the output of audio dialogue.

According to various aspects, comprehension or interpretation of either the words uttered in the dialogue or the text expressed in the subtitles is not necessarily required. Rather, the measure of synchronization may be based, more simply, on the presence or absence of subtitles and the presence or absence of audio dialogue at particular reference time points. As such, according to various embodiments, the determination of the measure of synchronization is agnostic with respect to the specific language(s) in which the subtitle text and/or the audio dialogue are presented.

Figure 4:
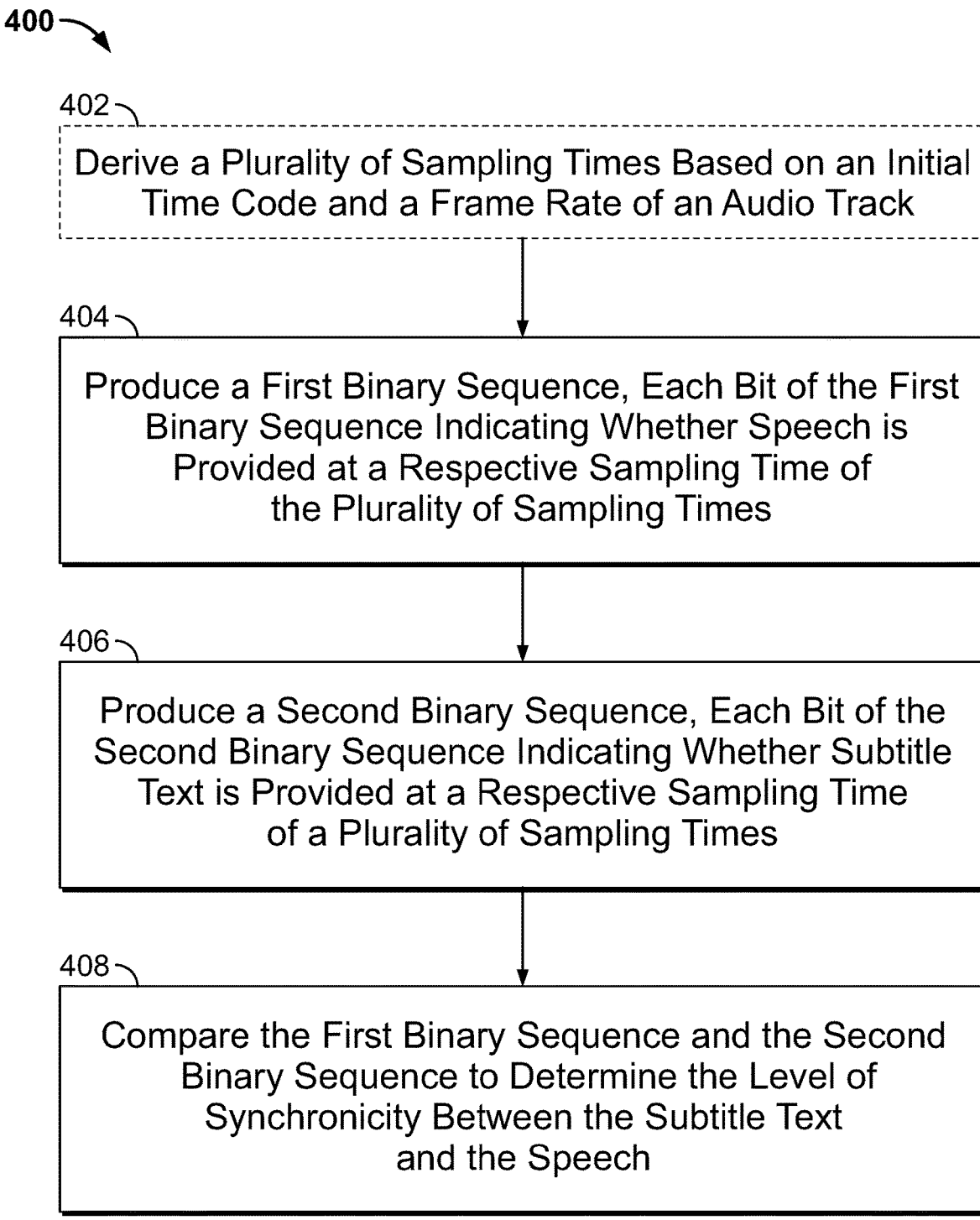
FIG. 4 is a flowchart illustrating a method of providing an output manifest representing a video channel according to at least one embodiment.

FIG. 4 illustrates a flowchart of a method 400 of determining a level of synchronicity between subtitle text in audiovisual content and speech that would be heard during display of the audiovisual content according to at least one embodiment.

At block 402, a plurality of sampling times may be determined based on an initial time code and a frame rate of an audio track corresponding to the audiovisual content.

For example, as described earlier with reference to FIG. 1A, time markers may not be present in the audio track 102. Time reference points that are identified are utilized to align the detection of a human voice, in the time domain, with specific points in time. For example, based on a specific anchor reference point (e.g., anchor timecode) and a provided frame rate (e.g., 25 fps), specific time reference points (e.g., 0 minutes:40 seconds, 0 minutes:50 seconds, etc. in a 60-second long audio track) may be identified.

At block 404, a first binary sequence is produced (or accessed or received). Each bit of the first binary sequence indicates whether the speech is provided at a respective sampling time of a plurality of sampling times.

For example, an audio analysis of the audio track corresponding to the audiovisual content may be performed, to determine whether the speech is provided at each of the plurality of sampling times. Further by way of example, a voice detection may be performed to determine whether the audio track includes audio of a human voice at each of the plurality of sampling times.

For example, as described earlier with reference to FIG. 1A, a voice analysis 104 of the audio track 102 is performed to generate a sequence 108. Performing the voice analysis 104 may include using one or more voice detection tools configured to detect the presence (or, conversely, absence) of a human voice that would be heard at a given time during playback of the audio track 102.

At block 406, a second binary sequence is produced (or accessed or received). Each bit of the second binary sequence indicates whether the subtitle text is provided at a respective sampling time of a plurality of sampling times.

For example, it may be determined whether a subtitle file provides the subtitle text at each of the plurality of sampling times.

For example, as described earlier with reference to FIG. 1A, an analysis of the subtitle file 112 in the ASCII format is performed by analyzer 114. The analysis may include determining whether subtitle text would appear (or, conversely, would not appear) at particular points in time (e.g., the time reference points described earlier with reference to the audio track 102). Based on the position markers and the subtitles that are included in the subtitle file 112, the analyzer 114 generates a sequence 118.

According to a further embodiment, adjacent sampling times of the plurality of sampling times are spaced apart by a periodic interval (e.g., an interval of 10 seconds, 20 seconds, etc.).

At block 408, the first binary sequence and the second binary sequence are compared (e.g., against each other) to determine the level of synchronicity between the subtitle text and the speech.

For example, a cross-correlation between the first binary sequence (e.g., sequence 108 of FIG. 1A) and the second binary sequence (e.g., sequence 118 of FIG. 1A) may be performed. The comparison of the first binary sequence and the second binary sequence may be based on an average cross-correlation value that is based, in turn, on a respective cross-correlation value between the first binary sequence and the second binary sequence at each of a plurality of sample intervals.

For example, as described earlier with reference to FIG. 2B, a cross-correlation value in the sample interval 228 is determined, where the sample interval 228 is eight samples in length.

As another example, a phase difference between the first binary sequence (e.g., sequence 108 of FIG. 1A) and the second binary sequence (e.g., sequence 118 of FIG. 1A) may be analyzed. The comparison of the first binary sequence and the second binary sequence may be based on an average phase difference that is based, in turn, on a respective phase difference between the first binary sequence and the second binary sequence at each of a plurality of sample intervals.

For example, as described earlier with reference to FIG. 1, the sequences 108, 118 may be sliced, and the behavior of the sequences in each of the sample intervals may be analyzed and compared. For example, for a particular sample interval (e.g., a sample interval beginning at 0 minutes:30 seconds and ending at 0 minutes:40 seconds), the phase difference between the sequences 108, 118 is calculated. Once such a phase difference has been determined for each of the sample intervals, a single value may be determined as a measure of synchronization. For example, an average value of all of the calculated phase difference values may be calculated to produce an average 'sync' value. This value, which may be denoted as a percentage, may serve as a measure of synchronization.

In at least some embodiments, one or more systems are configured to implement and/or perform features described herein (e.g., features described earlier with reference to FIGS. 1A, 1B, 2A, 2B, 2C and/or 4). Such a system may include one or more software or hardware computer systems and may further include (or may be operably coupled to) one or more hardware memory systems for storing information including databases for storing, accessing, and querying various content, encoded data, shared addresses, metadata, etc. In hardware implementations, the one or more computer systems incorporate one or more computer processors and controllers.

Features described herein may be each implemented in a hardware processor of the one or more computer systems, and, in one embodiment, a single processor may be configured to implement the various features. The hardware system may include various transitory and non-transitory memory for storing information, wired and wireless communication receivers and transmitters, displays, and input and output interfaces and devices. The various computer systems, memory, and components of the system may be operably coupled to communicate information, and the system may further include various hardware and software communication modules, interfaces, and circuitry to enable wired or wireless communication of information.

Figure 5:
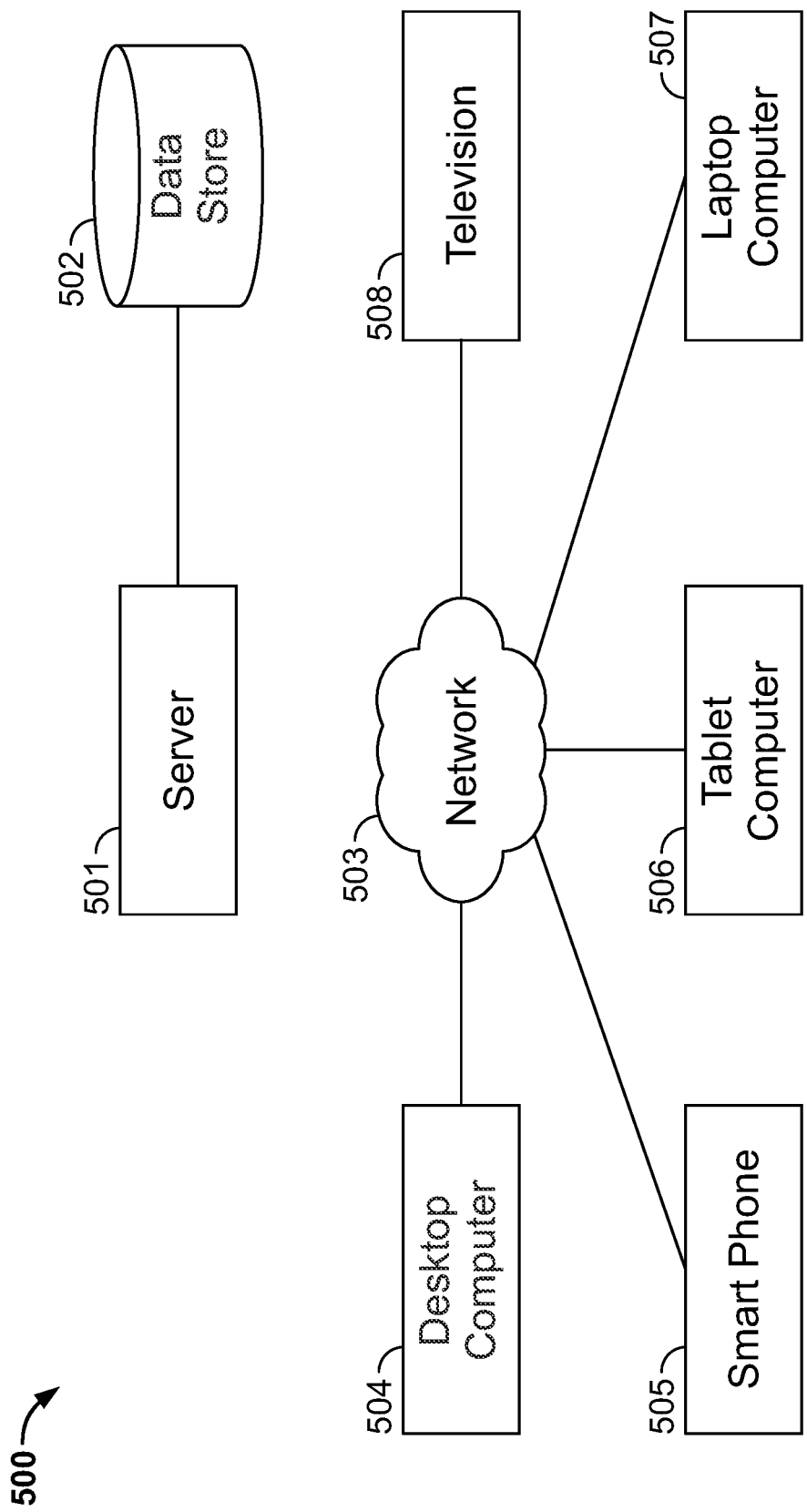
FIG. 5 is an illustration of a computing environment according to at least one embodiment.

In selected embodiments, features and aspects described herein may be implemented within a computing environment 500, as shown in FIG. 5, which may include one or more computer servers 501. The server 501 may be operatively coupled to one or more data stores 502 (e.g., databases, indexes, files, or other data structures). The server 501 may connect to a data communication network 503 including a local area network (LAN), a wide area network (WAN) (e.g., the Internet), a telephone network, a satellite or wireless communication network, or some combination of these or similar networks.

One or more client devices 504, 505, 506, 507, 508 may be in communication with the server 501, and a corresponding data store 502 via the data communication network 503. Such client devices 504, 505, 506, 507, 508 may include, for example, one or more laptop computers 507, desktop computers 504, smartphones and mobile phones 505, tablet computers 506, televisions 508, or combinations thereof. In operation, such client devices 504, 505, 506, 507, 508 may send and receive data or instructions to or from the server 501 in response to user input received from user input devices or other input. In response, the server 501 may serve data from the data store 502, alter data within the data store 502, add data to the data store 502, or the like, or combinations thereof.

In selected embodiments, the server 501 may transmit one or more media files including audio and/or video content, encoded data, generated data, and/or metadata from the data store 502 to one or more of the client devices 504, 505, 506, 507, 508 via the data communication network 503. The devices may output the audio and/or video content from the media file using a display screen, projector, or other display output device. In certain embodiments, the environment 500 configured in accordance with features and aspects described herein may be configured to operate within or support a cloud computing environment. For example, a portion of, or all of, the data store 502 and server 501 may reside in a cloud server.

Figure 6:
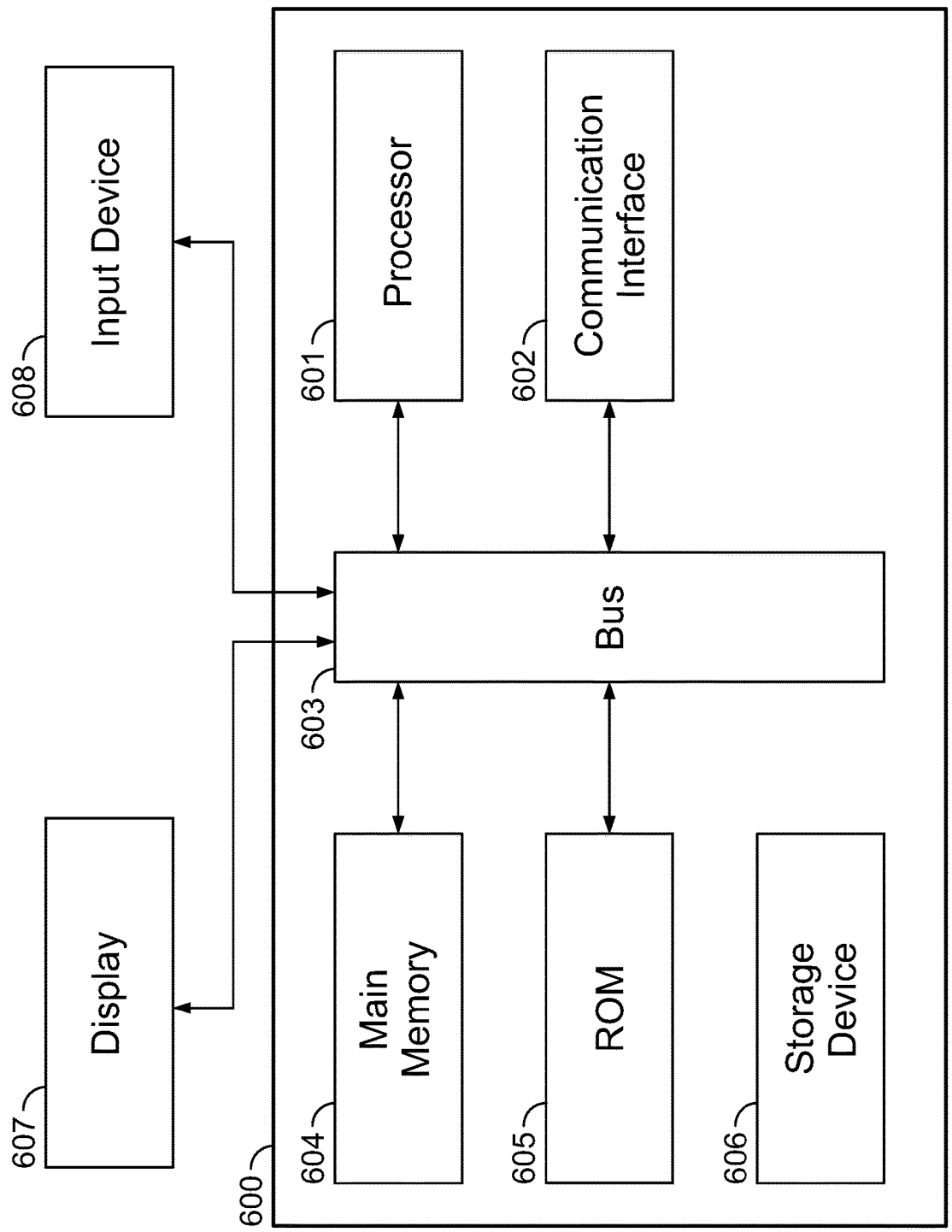
FIG. 6 is a block diagram of a device according to at least one embodiment.

With reference to FIG. 6, an illustration of an example computer 600 is provided. One or more of the devices 504, 505, 506, 507, 508 of the environment 500 may be configured as or include such a computer 600.

In selected embodiments, the computer 600 may include a bus 603 (or multiple buses) or other communication mechanism, a processor 601, main memory 604, read only memory (ROM) 605, one or more additional storage devices 606, and/or a communication interface 602, or the like or sub-combinations thereof. Embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

The bus 603 or other communication mechanism, including multiple such buses or mechanisms, may support communication of information within the computer 600. The processor 601 may be connected to the bus 603 and process information. In selected embodiments, the processor 601 may be a specialized or dedicated microprocessor configured to perform particular tasks in accordance with the features and aspects described herein by executing machine-readable software code defining the particular tasks. Main memory 604 (e.g., random access memory—or RAM—or other dynamic storage device) may be connected to the bus 603 and store information and instructions to be executed by the processor 601. Main memory 604 may also store temporary variables or other intermediate information during execution of such instructions.

ROM 605 or some other static storage device may be connected to a bus 603 and store static information and instructions for the processor 601. The additional storage device 606 (e.g., a magnetic disk, optical disk, memory card, or the like) may be connected to the bus 603. The main memory 604, ROM 605, and the additional storage device 606 may include a non-transitory computer-readable medium holding information, instructions, or some combination thereof—for example, instructions that, when executed by the processor 601, cause the computer 600 to perform one or more operations of a method as described herein. The communication interface 602 may also be connected to the bus 603. A communication interface 602 may provide or support two-way data communication between the computer 600 and one or more external devices (e.g., other devices contained within the computing environment).

In selected embodiments, the computer 600 may be connected (e.g., via the bus 603) to a display 607. The display 607 may use any suitable mechanism to communicate information to a user of a computer 600. For example, the display 607 may include or utilize a liquid crystal display (LCD), light emitting diode (LED) display, projector, or other display device to present information to a user of the computer 600 in a visual display. One or more input devices 608 (e.g., an alphanumeric keyboard, mouse, microphone) may be connected to the bus 603 to communicate information and commands to the computer 600. In selected embodiments, one input device 608 may provide or support control over the positioning of a cursor to allow for selection and execution of various objects, files, programs, and the like provided by the computer 600 and displayed by the display 607.

The computer 600 may be used to transmit, receive, decode, display, etc. one or more video files. In selected embodiments, such transmitting, receiving, decoding, and displaying may be in response to the processor 601 executing one or more sequences of one or more instructions contained in main memory 604. Such instructions may be read into main memory 604 from another non-transitory computer-readable medium (e.g., a storage device).

Execution of sequences of instructions contained in main memory 604 may cause the processor 601 to perform one or more of the procedures or steps described herein. In selected embodiments, one or more processors in a multi-processing arrangement may also be employed to execute sequences of instructions contained in main memory 604. Alternatively, or in addition thereto, firmware may be used in place of, or in connection with, software instructions to implement procedures or steps in accordance with the features and aspects described herein. Thus, embodiments in accordance with features and aspects described herein may not be limited to any specific combination of hardware circuitry and software.

Non-transitory computer readable medium may refer to any medium that participates in holding instructions for execution by the processor 601, or that stores data for processing by a computer, and include all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, the communication interface 602 may provide or support external, two-way data communication to or via a network link. For example, the communication interface 602 may be a wireless network interface controller or a cellular radio providing a data communication network connection. Alternatively, the communication interface 602 may include a LAN card providing a data communication connection to a compatible LAN. In any such embodiment, the communication interface 602 may send and receive electrical, electromagnetic, or optical signals conveying information.

A network link may provide data communication through one or more networks to other data devices (e.g., client devices as shown in the computing environment 500). For example, a network link may provide a connection through a local network of a host computer or to data equipment operated by an Internet Service Provider (ISP). An ISP may, in turn, provide data communication services through the Internet. Accordingly, a computer 600 may send and receive commands, data, or combinations thereof, including program code, through one or more networks, a network link, and communication interface 602. Thus, the computer 600 may interface or otherwise communicate with a remote server (e.g., server 501), or some combination thereof.

The various devices, modules, terminals, and the like described herein may be implemented on a computer by execution of software comprising machine instructions read from computer-readable medium, as discussed above. In certain embodiments, several hardware aspects may be implemented using a single computer; in other embodiments, multiple computers, input/output systems and hardware may be used to implement the system.

For a software implementation, certain embodiments described herein may be implemented with separate software modules, such as procedures and functions, each of which performs one or more of the functions and operations described herein. The software codes can be implemented with a software application written in any suitable programming language and may be stored in memory and executed by a controller or processor.

The foregoing described embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method for determining a level of synchronicity between subtitle text in audiovisual content and speech that would be heard during display of the audiovisual content, the method comprising:
    accessing a first binary sequence, each bit of the first binary sequence indicating whether the speech is provided at a respective sampling time of a plurality of sampling times;
    accessing a second binary sequence, each bit of the second binary sequence indicating whether the subtitle text is provided at a respective sampling time of a plurality of sampling times; and
    comparing the first binary sequence and the second binary sequence to determine the level of synchronicity between the subtitle text and the speech.

2. The method of claim 1, wherein accessing the first binary sequence comprises performing an audio analysis of an audio track corresponding to the audiovisual content, to determine whether the speech is provided at each of the plurality of sampling times.

3. The method of claim 2, wherein performing the audio analysis of the audio track comprises performing a voice detection to determine whether the audio track includes audio of a human voice at each of the plurality of sampling times.

4. The method of claim 2, further comprising deriving the plurality of sampling times based on an initial time code and a frame rate of the audio track.

5. The method of claim 1, wherein accessing the second binary sequence comprises determining whether a subtitle file provides the subtitle text at each of the plurality of sampling times.

6. The method of claim 1, wherein adjacent sampling times of the plurality of sampling times are spaced apart by a periodic interval.

7. The method of claim 1, wherein comparing the first binary sequence and the second binary sequence comprises performing a cross-correlation between the first binary sequence and the second binary sequence.

8. The method of claim 1, wherein comparing the first binary sequence and the second binary sequence is based on an average cross-correlation value that is based on a respective cross-correlation value between the first binary sequence and the second binary sequence at each of a plurality of sample intervals.

9. The method of claim 1, wherein comparing the first binary sequence and the second binary sequence comprises analyzing a phase difference between the first binary sequence and the second binary sequence.

10. The method of claim 1, wherein comparing the first binary sequence and the second binary sequence is based on an average phase difference that is based on a respective phase difference between the first binary sequence and the second binary sequence at each of a plurality of sample intervals.

11. An apparatus for determining a level of synchronicity between subtitle text in audiovisual content and speech that would be heard during display of the audiovisual content, the apparatus comprising:
a network communication unit configured to transmit and receive data; and
one or more controllers configured to:
access a first binary sequence, each bit of the first binary sequence indicating whether the speech is provided at a respective sampling time of a plurality of sampling times;
access a second binary sequence, each bit of the second binary sequence indicating whether the subtitle text is provided at a respective sampling time of a plurality of sampling times; and
compare the first binary sequence and the second binary sequence to determine the level of synchronicity between the subtitle text and the speech.

12. The apparatus of claim 11, wherein the one or more controllers are further configured to access the first binary sequence by performing an audio analysis of an audio track corresponding to the audiovisual content, to determine whether the speech is provided at each of the plurality of sampling times.

13. The apparatus of claim 12, wherein the one or more controllers are further configured to perform the audio analysis of the audio track by performing a voice detection to determine whether the audio track includes audio of a human voice at each of the plurality of sampling times.

14. The apparatus of claim 12, wherein the one or more controllers are further configured to derive the plurality of sampling times based on an initial time code and a frame rate of the audio track.

15. The apparatus of claim 11, wherein the one or more controllers are further configured to access the second binary sequence by determining whether a subtitle file provides the subtitle text at each of the plurality of sampling times.

16. The apparatus of claim 11, wherein the one or more controllers are further configured to compare the first binary sequence and the second binary sequence by performing a cross-correlation between the first binary sequence and the second binary sequence.

17. The apparatus of claim 11, wherein comparing the first binary sequence and the second binary sequence is based on an average cross-correlation value that is based on a respective cross-correlation value between the first binary sequence and the second binary sequence at each of a plurality of sample intervals.

18. The apparatus of claim 11, wherein the one or more controllers are further configured to compare the first binary sequence and the second binary sequence by analyzing a phase difference between the first binary sequence and the second binary sequence.

19. The apparatus of claim 11, wherein comparing the first binary sequence and the second binary sequence is based on an average phase difference that is based on a respective phase difference between the first binary sequence and the second binary sequence at each of a plurality of sample intervals.

20. A machine-readable non-transitory medium having stored thereon machine-executable instructions for determining a level of synchronicity between subtitle text in audiovisual content and speech that would be heard during display of the audiovisual content, the instructions comprising:
accessing a first binary sequence, each bit of the first binary sequence indicating whether the speech is provided at a respective sampling time of a plurality of sampling times;
accessing a second binary sequence, each bit of the second binary sequence indicating whether the subtitle text is provided at a respective sampling time of a plurality of sampling times; and
comparing the first binary sequence and the second binary sequence to determine the level of synchronicity between the subtitle text and the speech.

* * * * *